(12) United States Patent
Mayer

(10) Patent No.: US 8,651,443 B2
(45) Date of Patent: Feb. 18, 2014

(54) DEVICE FOR THE CLAMPING ATTACHMENT OF A SCALE

(75) Inventor: Reinhard Mayer, Traunstein (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 176 days.

(21) Appl. No.: 13/000,692

(22) PCT Filed: May 20, 2009

(86) PCT No.: PCT/EP2009/056139
§ 371 (c)(1),
(2), (4) Date: Feb. 17, 2011

(87) PCT Pub. No.: WO2010/000541
PCT Pub. Date: Jan. 7, 2010

(65) Prior Publication Data
US 2011/0155876 A1    Jun. 30, 2011

(30) Foreign Application Priority Data
Jul. 1, 2008 (DE) .......................... 10 2008 030 718

(51) Int. Cl.
| | |
|---|---|
| A47B 96/06 | (2006.01) |
| E04G 3/00 | (2006.01) |
| F16B 1/00 | (2006.01) |
| G09F 7/18 | (2006.01) |
| A47F 5/00 | (2006.01) |
| A47F 5/08 | (2006.01) |
| A47H 1/10 | (2006.01) |
| A45D 42/14 | (2006.01) |
| F16B 47/00 | (2006.01) |
| A47B 97/00 | (2006.01) |
| F16B 37/02 | (2006.01) |
| F16B 37/04 | (2006.01) |
| F16B 21/18 | (2006.01) |
| F16B 21/08 | (2006.01) |

(52) U.S. Cl.
USPC .................. 248/228.7; 248/205.5; 248/205.7; 248/229.16; 248/230.7; 248/500; 411/174; 411/112; 411/520; 411/970; 403/397

(58) Field of Classification Search
USPC .............. 248/123.11, 300, 228.7, 200, 230.1, 248/231.81, 316.7; 411/174, 175; 33/706, 33/707, DIG. 21; 403/397
IPC ...... A47B 96/06,97/00; E04G 3/00; F16B 1/00, F16B 37/02, 37/04, 39/284, 21/18, 21/08; G09F 7/18
See application file for complete search history.

(56) References Cited

U.S. PATENT DOCUMENTS

| | | | | |
|---|---|---|---|---|
| 656,274 | A * | 8/1900 | Streeter | 403/387 |
| 3,720,395 | A * | 3/1973 | Schuplin | 248/228.7 |

(Continued)

FOREIGN PATENT DOCUMENTS

| | | |
|---|---|---|
| DE | 30 08 384 A1 | 9/1981 |
| DE | 196 13 557 A1 | 6/1997 |

(Continued)

*Primary Examiner* — Daniel J Troy
*Assistant Examiner* — Muhammad Ijaz
(74) *Attorney, Agent, or Firm* — Brinks Gilson & Lione

(57) ABSTRACT

A device for clamping a scale to an attachment face of a support, the device including a securing element and a clamping element that is secured to a support by the securing element. The clamping element includes a first spring element that is resilient in a first direction toward an attachment face of the support, wherein the first spring element introduces a first clamping force on a scale in a direction of the attachment face. The clamping element further includes a second spring element that is resilient in a second direction that extends perpendicular to the first direction and wherein the second spring element introduces a second clamping force onto the scale in the second direction.

9 Claims, 3 Drawing Sheets

(56) References Cited

U.S. PATENT DOCUMENTS

| | | | |
|---|---|---|---|
| 3,952,985 A * | 4/1976 | Davenport | 248/317 |
| 4,413,416 A | 11/1983 | Ernst | |
| 4,595,991 A * | 6/1986 | Spies | 33/12 |
| 4,684,305 A * | 8/1987 | Dubost | 411/174 |
| 4,777,728 A | 10/1988 | Ludicke | |
| 4,883,397 A * | 11/1989 | Dubost | 411/174 |
| 5,423,646 A * | 6/1995 | Gagnon | 411/184 |
| 5,510,581 A * | 4/1996 | Angel | 177/211 |
| 7,322,551 B2 * | 1/2008 | Simonsen | 248/231.81 |
| 7,390,111 B2 * | 6/2008 | Lippis | 362/396 |
| 2002/0060280 A1 * | 5/2002 | Yaphe et al. | 248/317 |
| 2006/0201720 A1 * | 9/2006 | Williamson | 177/238 |
| 2008/0191107 A1 * | 8/2008 | Pucher et al. | 248/201 |
| 2008/0224015 A1 * | 9/2008 | Biggers et al. | 248/500 |

FOREIGN PATENT DOCUMENTS

| | | |
|---|---|---|
| EP | 0 264 801 A1 | 10/1987 |
| WO | WO 2006/133753 A1 | 12/2006 |

* cited by examiner

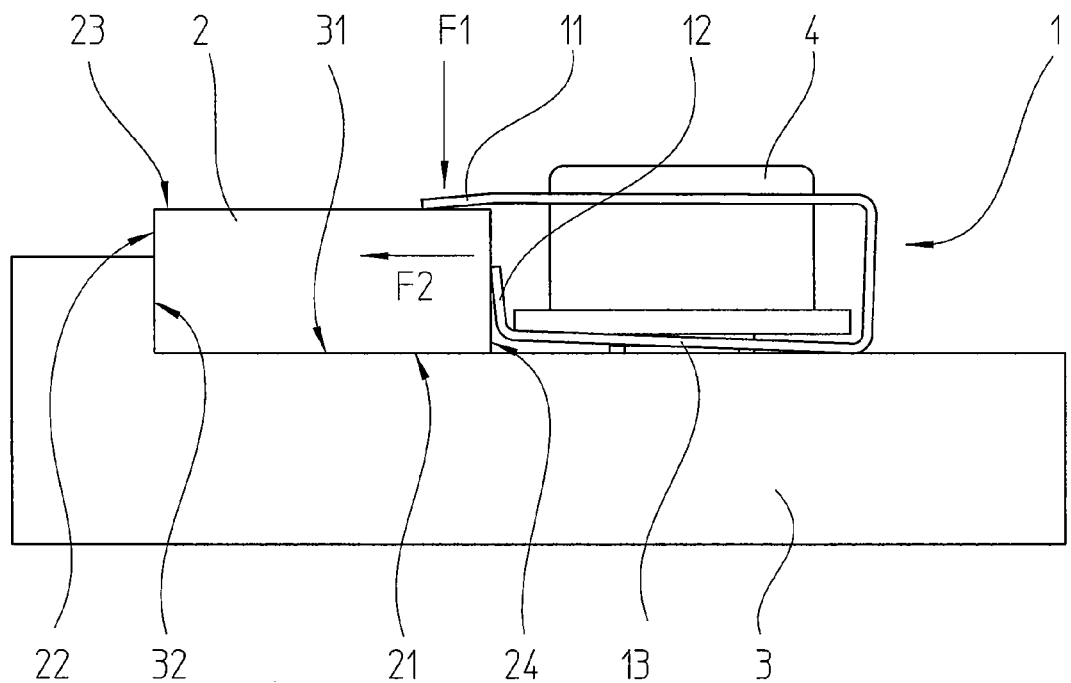
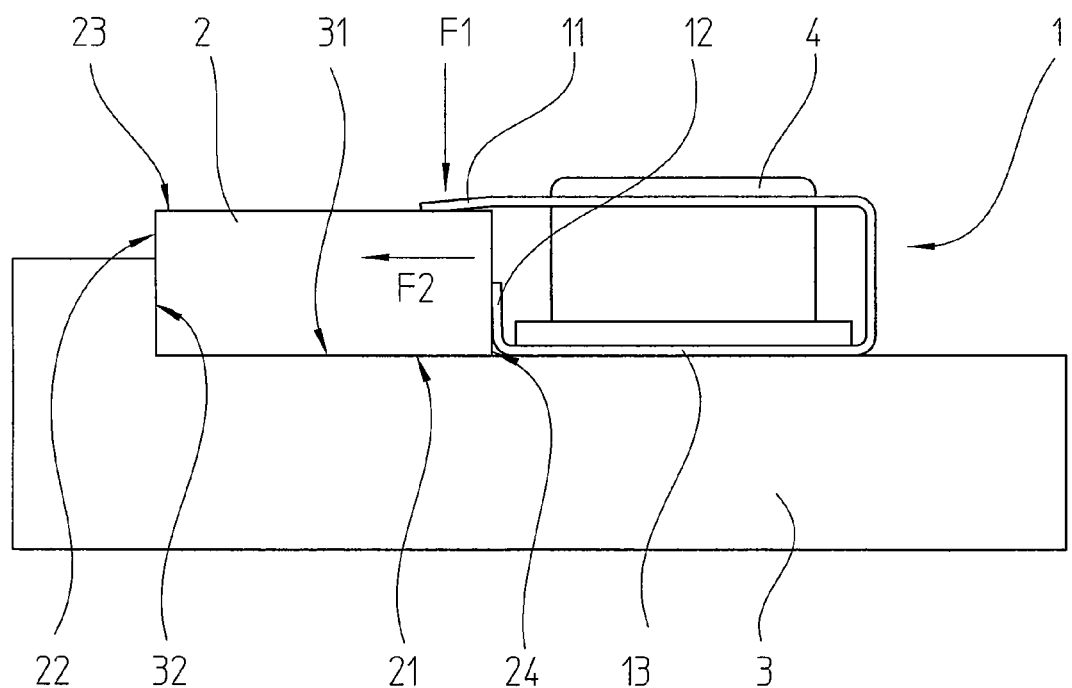

DEVICE FOR THE CLAMPING ATTACHMENT OF A SCALE

Applicant claims, under 35 U.S.C. §§120 and 365, the benefit of priority of the filing date of May 20, 2009 of a Patent Cooperation Treaty patent application, copy attached, Serial Number PCT/EP2009/056139, filed on the aforementioned date, the entire contents of which are incorporated herein by reference, wherein Patent Cooperation Treaty patent application Serial Number PCT/EP2009/056139 was not published under PCT Article 21(2) in English.

Applicant claims, under 35 U.S.C. §119, the benefit of priority of the filing date of Jul. 1, 2008 of a German patent application, copy attached, Serial Number 10 2008 030 718.1, filed on the aforementioned date, the entire contents of which is incorporated herein by reference.

BACKGROUND OF THE INVENTION

1. Field of the Invention

The present invention relates to a device for clamping attachment of a scale.

The present invention also relates to a device, having a scale secured in clamping fashion to an attachment face of a support.

2. Description of the Related Art

Clamping is a widely used way of securing a scale to an attachment face.

For clamping, resilient clamping elements in the form of resilient clamps are used, which are screwed onto the attachment face and exert a clamping force on the scale. One such device is known from German Patent Disclosure DE 3008384 A1.

A further device for clamping attachment of a scale, which is a point of departure for the present invention, is described in International Patent Disclosure WO 2006/133753 A1. In it, clamping elements in the form of resilient clamps are used to force the scale against an attachment face. WO 2006/133753 A1 shows that efforts have already been made to force the scale against an attachment face, on the one hand, and on the other, to fasten it perpendicular thereto as well. FIG. 5 as well as FIGS. 7 through 11 of WO 2006/133753 A1 show clamping elements for this purpose that each have a spring element which forces the scale against the attachment face in a first direction. Each of the clamping elements also has one further spring element that is resilient perpendicular to the first spring element and exerts a clamping force in a second direction on the scale. The problem here, however, is to exert or introduce the clamping force in this second direction. As FIGS. 9 and 10 of WO 2006/133753 A1 show, an assembly device has been proposed for that purpose.

SUMMARY AND OBJECTS OF THE INVENTION

An object of the present invention is to create a device with which the scale can be secured simply and replicably.

This object is attained by a device for clamping a scale to an attachment face of a support, the device including a securing element and a clamping element that is secured to a support by the securing element. The clamping element includes a first spring element that is resilient in a first direction toward an attachment face of the support, wherein the first spring element introduces a first clamping force on a scale in a direction of the attachment face. The clamping element further includes a second spring element that is resilient in a second direction that extends perpendicular to the first direction and wherein the second spring element introduces a second clamping force onto the scale in the second direction.

This object is further attained by a device including a support with an attachment face, a scale and a clamping element that is secured to the support by a securing element and wherein the clamping element secures the scale to the support. The clamping element including a first spring element that is resilient in a first direction toward an attachment face of the support, wherein the first spring element introduces a first clamping force on a scale in a direction of the attachment face. The clamping element further including a second spring element that is resilient in a second direction that extends perpendicular to the first direction and wherein the second spring element introduces a second clamping force onto the scale in the second direction.

The device embodied according to the present invention has the advantage that the for clamping the scale to a support in two directions perpendicular to one another is achieved by simple securing of the clamping element to this support. By screwing the clamping element onto the support, both a first clamping force via a first spring element and a second clamping force acting perpendicular to the first clamping force via a second spring element are introduced onto the scale. The two clamping forces are exerted replicably as a result of the embodiment of the clamping element.

One exemplary embodiment of the present invention will be described in further detail in conjunction with the drawings.

Shown are:

BRIEF DESCRIPTION OF THE DRAWINGS

FIG. 4 shows a possible a third assembly state of the clamping element of FIG. 1; and FIG. 5 shows both the clamping element of FIG. 1 with the clamped scale of FIG. 2 clamped in a final state of a clamping operation in accordance with the present invention.

DESCRIPTION OF THE PREFERRED EMBODIMENT(S) OF THE INVENTION

Figure 1:
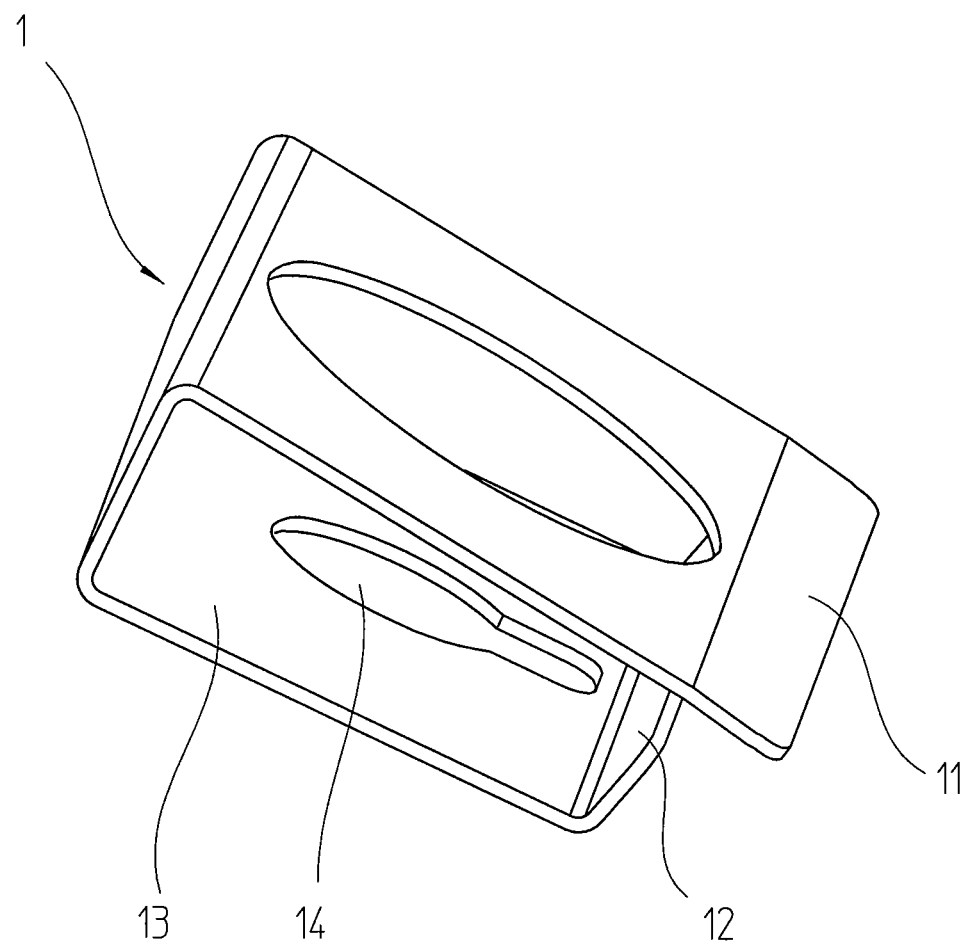
FIG. 1 shows a perspective view of a first embodiment of a clamping element in accordance with the present invention.

In FIG. 1, a clamping element 1 embodied according to the present invention is shown in a perspective view. The way in which a scale 2 is secured in clamping fashion to a support 3 by clamping element 1 is shown in FIGS. 2 through 5, in each case in a section perpendicular to the measurement direction. The scale 2 includes glass or metal, for instance. The scale 2 has two surfaces extending parallel to one another, namely the top side 23 and the underside 21, as well as two side faces 22 and 24 oriented perpendicular to them. On the top side 23, there is a measurement division, not shown, that can be scanned photoelectrically, magnetically, inductively, or capacitively.

The support 3 is advantageously a machine part whose position is to be measured. However, the support 3 may also be an intermediate support, which can then in turn be secured to some object that is to be measured.

The clamping element 1 is designed on the one hand for forcing the scale 2 with a first clamping force F1 against an attachment face 31 and on the other hand with a second clamping force F2 to force it against a stop 32 acting perpendicular to the attachment face 31. In this example, the stop 32 has a stop face 32 oriented perpendicular to the attachment face 31. For that purpose, the clamping element 1 has a first spring element 11 that is resilient in a first direction toward the attachment face 31, and upon engagement with the top side 23 of scale 2 the first spring element 11 exerts the first clamping force F1 on the scale 2. The clamping element 1 furthermore has a second spring element 12 that is resilient in a second direction toward the stop face 32 and upon engagement with the side face 24 of the scale 2 the second spring element 2 exerts the second clamping force F2 on the scale 2.

In the example shown, the clamping element 1 is a flexible part made from spring sheet metal, in which the first spring element 11 is a first resilient bending arm and the second spring element 12 is a second resilient bending arm. The first spring element 11 in the form of a bending arm and the second spring element 12 in the form of a bending arm are disposed on a securing portion 13 of the clamping element 1. Upon securing of the clamping element on the support 3, the securing portion 13 is engaged with the support 3 by a securing element.

Figure 2:
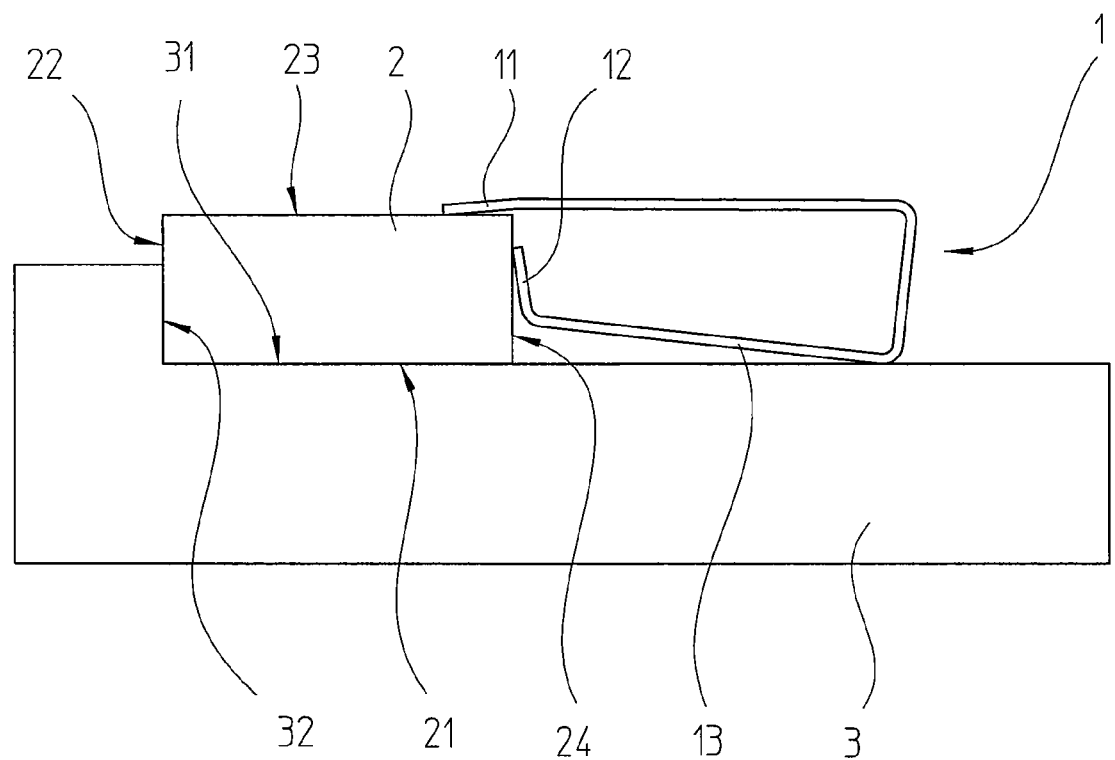
FIG. 2 shows a possible a first assembly state of the clamping element of FIG. 1 when used with a first embodiment of a scale in accordance with the present invention.

For attachment of the scale 2 to the support 3, the scale 2 is placed with its underside 21 on the attachment face 31 and is placed with its side 22, extending perpendicular to the attachment face, against the stop face 32, as shown in FIG. 2. The clamping element 1 is placed on the scale 2 in such a way that the first spring element 11 enters into contact with the top side 23 of the scale 2, and the second spring element 12 enters into contact with a side 24 of the scale 2 that extends perpendicular to the top side 23 of the scale 2. In the measurement direction, the clamping element 1 is positioned in such a way that its securing portion 13, with a bore 14 provided in it, comes to rest above a threaded bore provided in the support 3.

The first spring element 11 is embodied such that the first spring element introduces the first clamping force F1 when the clamping element 1 is secured to the support 3 by a securing element. The second spring element 12 is embodied such that the second spring element 12 introduces the second clamping force F2, upon securing of the clamping element 1 to the support 3 by means of the securing element. To that end, the clamping element 1 has the securing portion 13 engaged by the securing element and forces the securing portion 13 against the attachment face 31 that results in the introduction of the clamping forces F1 and F2.

Figure 3:
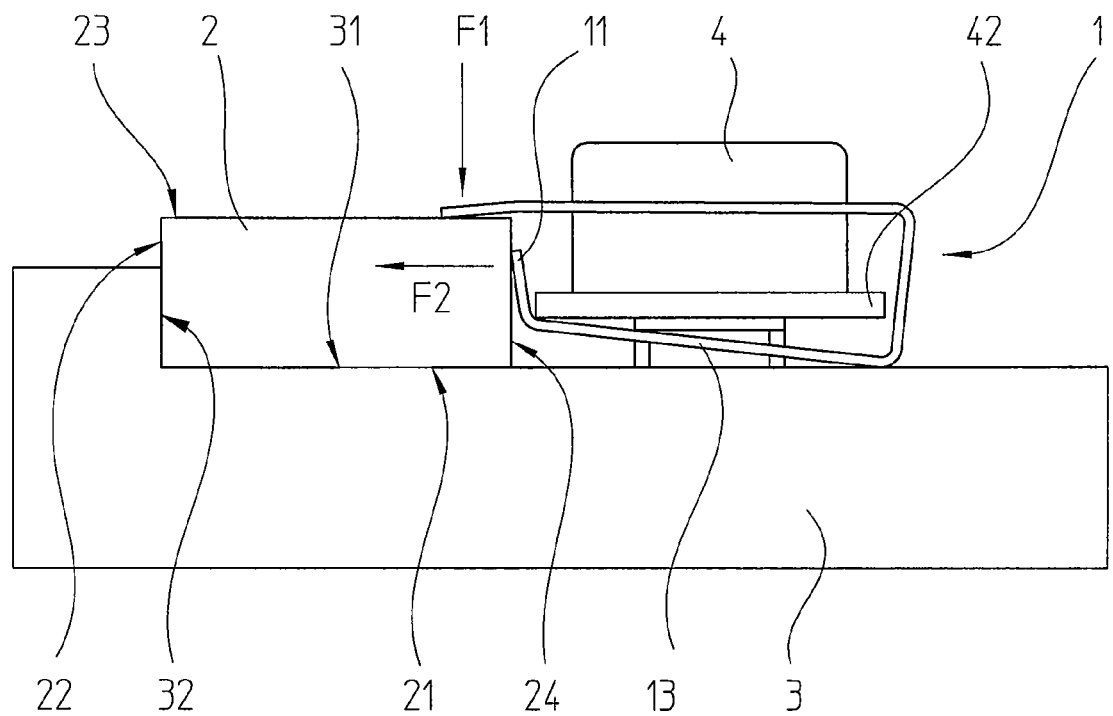
FIG. 3 shows a possible a second assembly state of the clamping element of FIG. 1.

FIG. 3 shows how the securing element, in the form of a screw 4, is screwed through a bore 14 of the securing portion 13 into the support 3, and the head of the screw 4 shifts the securing portion 13 toward the attachment face 31 in the process. As shown in FIG. 4, the progressive screwing in of the screw 4 causes an increase in the clamping force F1 and at the same time an increase in the clamping force F2. For that purpose, the securing portion 13 extends at an incline to the attachment face 31 and is braced at one point on the attachment face 31. As the screw 4 is screwed into the support 3, the angle of inclination of the securing portion 13 relative to the attachment face 31 changes; in this example, the angle of inclination decreases. The change in the angle of inclination of the securing portion 13, or in other words the tilting, causes an increase in the clamping force F1 and simultaneously an increase in the clamping force F2.

FIG. 5 shows the scale 2 in its fully clamped state. In this state, the securing portion 13 is pressed fully against the attachment face 31 and extends parallel to the attachment face 31.

It is especially advantageous if the second spring element 12 contacts the scale 2 in the center thereof, so that the clamping force F2, in the fully clamped state, engages the neutral plane of the scale 2, wherein the neutral plane contains the neutral axis of the scale 2. It is well understood in the art that a neutral axis of the scale 2 is an axis in the cross section of a beam or shaft along which there are no longitudinal stresses or strains. In the present embodiment, the neutral plane of the scale 2 is the middle portion of the scale 2 along the thickness direction.

The present invention makes it possible to secure the scale 2 replicably to the support 3 with clamping forces F1, F2 that are predetermined by the construction of the clamping element. Since the forces F1 and F2 required for the clamping is exerted in the two directions perpendicular to one another solely by the securing of the securing element 4 to the support 3, errors of assembly from varying individual manipulation by the installer are precluded, or at least reduced.

Between the securing portion 13 and the head of the screw 4, a shim 42 may be inserted. By varying the dimensions of the shim 42, the clamping force F2 can be varied. The greater the diameter of the shim 42, the more tightly does the securing force of the screw 4 engage the second spring element 12, so that the clamping force F2 is increased, compared to the use of smaller shims.

The clamping element 1 can be produced especially inexpensively if it is made in one piece as a bent part of spring sheet metal. In a manner not shown, however, it may also be a more-massive part, in which bending joints required for the function are embodied, in particular in the form of solid state joints, also named flexures or flexure hinges.

Depending on the length of the scale 2, a plurality of clamping elements 1 described above can be used for the securing, and in that case, viewed in the measurement direction, they are disposed spaced apart from one another.

Further embodiment variations of the method and devices in accordance with the present invention of course exist besides the explained examples and embodiments.

I claim:

1. A device comprising;
   a support comprising an attachment face;
   a scale;
   a clamping element that is secured to said support by a securing element and wherein said clamping element secures said scale to said support, said clamping element comprising:
   a first spring element that is resilient in a first direction toward an attachment face of said support, wherein said first spring element introduces a first clamping force on a scale in a direction of said attachment face; and
   a second spring element that is resilient in a second direction that extends perpendicular to said first direction and wherein said second spring element introduces a second clamping force onto said scale in said second direction.

2. The device as defined by claim 1, wherein said clamping element comprises a securing portion upon which said first spring element and said second spring element are each disposed, wherein said securing portion is secured by said securing element and wherein said securing portion is shiftable in position by said securing element so that as a result of a shifting in position of said securing portion said first clamping force and said second clamping force are introduced.

3. The device as defined by claim 2, wherein said shifting in position is a change in an angle of inclination between said attachment face and said securing portion.

4. The device as defined by claim 1, wherein said clamping element comprises a flexible part of spring sheet metal.

5. The device as defined by claim 1, wherein said securing element comprises a screw that is screwed into said support.

6. The device as defined by claim 5, wherein during screwing of said screw into said support causes an increase in said first clamping force and an increase in said second clamping force.

7. The device as defined by claim 1, wherein said support comprises a stop that acts perpendicular to said attachment face, and wherein said second spring element forces said scale with said second clamping force toward said stop.

8. The device as defined by claim 7, wherein said second spring element contacts a middle portion of said scale along a thickness direction and introduces said second clamping force at said middle portion.

9. The device as defined by claim 1, wherein said scale comprises a measurement division that can be scanned photoelectrically, magnetically, inductively or capacitively.

* * * * *

UNITED STATES PATENT AND TRADEMARK OFFICE
CERTIFICATE OF CORRECTION

PATENT NO. : 8,651,443 B2  Page 1 of 1
APPLICATION NO. : 13/000692
DATED : February 18, 2014
INVENTOR(S) : Reinhard Mayer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this
Twenty-ninth Day of September, 2015

Michelle K. Lee
*Director of the United States Patent and Trademark Office*